(12) United States Patent
Harvey et al.

(10) Patent No.: US 7,201,113 B2
(45) Date of Patent: Apr. 10, 2007

(54) CONTROLLED DILUTION SYSTEM FOR DRINKING WATER AND UNIT THEREFOR

(75) Inventors: Wayne A. Harvey, Halifax (CA); Terence F. Mullins, Ste-Marthe-sure-le-Lac (CA); William G. Moulton, Carleton Place (CA); James R. Heberling, Suwanee, GA (US)

(73) Assignee: Iosolutions Incorporated, Halifax, Nova Scotia (CA)

( * ) Notice: Subject to any disclaimer, the term of this patent is extended or adjusted under 35 U.S.C. 154(b) by 140 days.

(21) Appl. No.: 11/100,435

(22) Filed: Apr. 7, 2005

(65) Prior Publication Data

US 2005/0229859 A1    Oct. 20, 2005

(30) Foreign Application Priority Data

Apr. 14, 2004  (CA) .................................. 2464181

(51) Int. Cl.
*A01K 7/00* (2006.01)
(52) U.S. Cl. ...................................................... 119/72
(58) Field of Classification Search .................. 119/72, 119/73, 74
See application file for complete search history.

(56) References Cited

U.S. PATENT DOCUMENTS

| | | | |
|---|---|---|---|
| 5,143,257 A |   | 9/1992 | Austin et al. |
| 5,447,641 A | * | 9/1995 | Wittig .......................... 210/756 |
| 5,490,726 A | * | 2/1996 | Davis et al. ................... 222/57 |
| 6,029,527 A | * | 2/2000 | Seitz et al. ............... 73/861.52 |
| 6,106,731 A | * | 8/2000 | Hayes .......................... 119/72 |
| 6,139,731 A |   | 10/2000 | Harvey et al. |
| 6,220,747 B1 |   | 4/2001 | Gosselin |
| 6,609,431 B1 | * | 8/2003 | Tietsworth et al. ...... 73/861.52 |

* cited by examiner

*Primary Examiner*—Thomas Price
(74) *Attorney, Agent, or Firm*—Jeffrey S. Melcher; Manelli Denison & Selter, PLLC

(57) ABSTRACT

Apparatus and for providing controlled addition of a first aqueous solution having a first concentration of an aqueous chemical species at a first flow rate to a second aqueous solution having a second flow rate to provide a diluted first solution of a desired selected concentration of the chemical species, the apparatus having
  a second solution sensor to obtain data on the second solution selected from the second flow rate and the temperature of the second solution;
  a first solution sensor to obtain data on the temperature of the first solution;
  a pump to effect addition of the first solution to the second solution to provide the diluted first solution; and
  a CPU (i) to receive the data selected from the second flow rate and temperature data from the second solution sensor;
  (ii) to receive the temperature sensing data on the first solution from the first solution sensor;
  (iii) to effect algorithmic treatment of the data from the first and second sensor, to provide pump control data; and
  (iv) to control the pump in consequence of the pump control data to effect controlled addition of the first solution to the second solution to provide the diluted first solution of the desired selected concentration of the chemical species. The apparatus is preferably used as part of a full drinking water delivery system which is economic and reliable over the full range of drinking water demands of livestock animals. The most preferred pump is a positive displacement gear pump.

30 Claims, 4 Drawing Sheets

CONTROLLED DILUTION SYSTEM FOR DRINKING WATER AND UNIT THEREFOR

FIELD OF THE INVENTION

This invention relates to apparatus and processes for delivering controlled amounts of chemical species, particularly antibiotics, disinfectants and the like, particularly, iodine species in water as a drinking source for farm livestock animals, birds and the like; and particularly, self-contained units of use in said apparatus and process.

BACKGROUND TO THE INVENTION

Of particular interest in a drinking water context, are those bacteria responsible for widespread occurrences and recurrences of intestinal infections in humans, namely, the coliform family of bacteria, e.g., *E coli*. These bacteria commonly contaminate drinking water supplies when waste water containing faecal material spills into a water supply, or when excessive anaerobic decay of vegetation in the water supply occurs.

Iodine has been used for water disinfection on a large scale in the past. Iodine is used commonly also for its antibiotic (sensu stricto) effects against bacteria, viruses and cysts, as these three pathogens constitute the most common health risks in maintaining biologically safe water supplies. Traditionally, crystalline iodine is dissolved in water under static conditions by the addition of small amounts of KI, which greatly enhances the dissolution of the iodine. In general, the actual inactivation mechanism of the pathogenicity of bacteria, viruses and cysts by iodine is poorly understood.

U.S. Pat. Nos. 5,919,374 and 6,139,731 describe a method and apparatus, respectively, for producing bacteria-free water containing iodine species under continuous dynamic water flow, comprising the steps of: (1) selecting a predetermined temperature; (2) heating a first water flow in the iodine chamber to the predetermined temperature; (3) providing solid iodine; (4) passing the first water flow at a first flow rate through solid iodine to dissolve said solid iodine into the first water flow to produce a saturated aqueous solution containing iodine species at the predetermined temperature; and; (5) blending the saturated solution with a second water flow to produce a diluted iodine species bacterium-free aqueous solution.

Practical application of this technology involved a device which was hydraulically coupled while the blending of the saturated iodine solution with mainline water was accomplished by utilizing back pressure to drive a stream of water through the iodine generating system.

It is known that under field conditions, e.g. in the barns and fields of factory farmed livestock, drinking operation flow rates fluctuate depending on peak demand and the age of the animals. No matter how many animals are housed in a barn, they tend to drink water at specific times during the day and establish peak water demand periods. In off-peak periods, water demand or flow rate in the system can fall off to the point where adjustments to the mainline valve in commercial systems are required in order to compensate for low water demand. This is particularly so with young animals, which do not draw a lot of water, even during peak demand periods. It has been found with adult animals, that the changes in water demand from peak to off-peak conditions do not substantially alter the concentration level of the diluted aqueous iodine solution, provided the concentration level of the saturated iodine solution is near constant and animal stocking densities are sufficient to provide minimum pressure requirements during off-peak periods. However, if water flow rate does drop below about 4 liters per minute, which often happens with young animals, or if flow rate during the off-peak period drops substantially below peak demand, which can happen with adult animals when stocking densities are low, there may be insufficient pressure to control the production of a consistent concentration of diluted aqueous iodine. Although these conditions can be manually controlled, such control requires constant monitoring by an operator, which is a situation that is not feasible in a livestock operation.

Additionally, as it is essential to maintain a minimum water pressure in barns in order to deliver sufficient quantities of water to the animals, the number and type of inline devices is an important consideration to the livestock grower. Cumulative pressure drops across the system will fluctuate dependent upon such factors as particle loading in filters or the addition of inline devices. This cumulative effect sometimes reduces overall water pressure below that which is required in order to deliver a consistent level of iodine. More importantly to the grower, this cumulative effect means that the animals are not receiving sufficient quantities of water.

Practical experience has shown that desired control of the addition of a solution of known concentration to a main line flow is not readily attainable since with back-pressure dependent delivery systems high pressure drops may be created during operations to produce unwanted hysterisis curves for chemical species since consistent reproducibility is essentially independent of water flows extending from new zero to very high flow rates.

Further, since cumulative pressure drops in a barn environment would not be accepted by the industry, in low pressure situations, pressure drops inherent in certain control systems could inhibit the flow of water and thereby prevent certain valve systems from operating.

It is most important, commercially, that a practical and reliable "fail-safe" control and delivery mechanism be employed. A non-reliable "fail-safe" system could result in either a flood or a shut down of the water supply to the animals, which could cause the death of some or all of the animals.

It is also important commercially that a delivery system should have an acceptable operational life span of at least 2 years and, also, not require premature extensive repairs or replacements.

There is a demand, therefor, for an improved drinking water delivery system that is economic, reliable and operable over the full range of practical water flow rates demanded by the livestock animals 24 hours a day.

SUMMARY OF THE INVENTION

It is an object of the present invention to provide apparatus for use in the controlled addition of a chemical species-containing solution to another solution, for use as drilling water, which is reliable and economic in an animal livestock environment.

It is a further object to provide said apparatus which is operative over a full range of flow rates, particularly, very low rates, to provide a known desired constant resultant concentration of the chemical species to the livestock.

It is a further object to provide a full delivery system for providing drinking water containing said chemical species, particularly, iodine species comprising said apparatus.

It is a further object to provide a process of delivering drinking water containing a desired known constant concentration of a chemical species, particularly, iodine species economically and, reliably over a full range of water delivery flow rates, in a continuous or intermittent manner upon in situ demand by livestock.

It is a further object to provide said apparatus system and process which does not rely on back pressure-as a means of injecting a known concentration of a chemical species containing aqueous solution into a drinking water flow.

Accordingly, in one aspect the invention provides apparatus of use in an animal drinking water system and providing controlled addition of a first aqueous solution having a first concentration of a chemical species at a first flow rate to a second aqueous solution having a second flow rate to provide a diluted first solution of a desired selected concentration of said chemical species as said drinking water, said apparatus comprising first solution sensing means to obtain data on the temperature of said first solution;
second solution sensing means to obtain data on said second solution selected from said second flow rate and the temperature of said second solution;
positive displacement injection pump means to effect addition of said first solution to said second solution to provide said diluted first solution; and
CPU means (i) to receive said data selected from said second flow rate data and temperature data from said second solution sensing means;
(ii) to receive said temperature sensing data on said first solution from said first solution sensing means;
(iii) to effect algorithmic treatment of said data from said first and second sensing means, to provide pump control data; and
(iv) to control said pump means in consequence of said pump control data to effect controlled addition of said first solution to said second solution to provide said diluted first solution of said desired selected concentration of said chemical species.

The apparatus, preferably, comprises a positive displacement gear pump which has, surprisingly, been found to reliably provide the requisite amount of first solution, even at extremely low flow rates of the diluted first solution when livestock demand for drinking water is minimal, i.e. as low as 0.01 l/m.

The apparatus and process are most preferably used to deliver the first solution when saturated with the chemical species, particularly, iodine species.

Thus, although the second flow rate, which to a first approximation is the same as that of the diluted first solution in view of the dilution ratios employed in a practical livestock environment is variable, the apparatus provides a constant concentration of chemical species in the drinking water independent of usage, for example, 1–50 ppm, preferably, 2–15 ppm iodine species in the diluted first solution drinking water.

The aforesaid apparatus according to the invention can be provided as a "stand alone" commercial unit which is adapted to be readily cooperable with on-site fixed delivery components comprising, for example, water delivery and diluted solutions lines, chemical species dissolution chambers, cartridges and the like, thermisters and valves, shown for example, in aforesaid U.S. Pat. Nos. 5,919,374 and 6,139,731.

Thus, in a further aspect, the invention provides an animal drinking water system comprising apparatus as hereinabove defined and further comprising (a) means for providing a first water flow;
(b) means for providing said second solution at said second flow rate;
(c) mixing means for effecting the dissolution of said chemical species into said first water flow to produce said first aqueous solution having said first concentration of said chemical species at a pre-selected temperature;
(d) heating means for heating said first aqueous solution; and
(e) wherein said CPU means further comprises means to effect algorithmic treatment of said temperature data of said first solution; and
temperature control means to control said heating means in consequence of said temperature data to provide said pre-determined temperature.

The apparatus and system are operable with second flow rates of from at least 0.01 to 100 l/min in providing drinking water at a resultant concentration of 2–50 ppm, and preferably, 2–15 ppm iodine species.

By the term "iodine species" as used in this specification is meant, collectively, dissolved molecular iodine and hypoiodous acid species present within the pH range 5–8. The ppm concentrations herein refer to the concentrations of these species determined as free molecular iodine.

BRIEF DESCRIPTION OF THE DRAWINGS

In order that the invention may be better understood, a preferred embodiment will now be described by way of example only with reference to the accompanying drawings, wherein.

and wherein the same numerals denote like parts.

DETAILED DESCRIPTION OF PREFERRED EMBODIMENTS

Equipment

It was determined that under the control of the CPU, by varying the voltage sent to the positive displacement gear pump, the speed of the pump varies and controllable as to inject the desired concentrated first solution only at the suitable delivery rate into the second solution to consistently provide the drinking water at the resultant desired concentration. The actual voltage requirements were determined by trial and error in a practical environment.

Flow Sensor

A vane-axle turbine driven flow rate sensor (Kobolt Instrumentation), which delivered 1,800 pulses per gallon, provided sufficient data points to measure low flow rates and monitor changes in flow rate.

Controller/Circuit Board

A microprocessor based controller for the generation and monitoring of an iodine supplemented livestock watering system was designed. The controller monitors the vane-axle turbine flow rate sensor and two or three thermocouples. The controller will control one or two positive displacement pumps dispensing liquor into the water feed line, along with a heater in the iodine dissolution cartridge chamber which maintains a constant temperature in the recharge chamber, preferably 80 degree. The unit included a 4 digit display for readout of liters dispensed and various other values, along with keyboard or other access for display control and user variable adjustment. Control functions were implemented as detailed in the specification hereinbelow, with whatever modifications necessary after field trials. Provision was made for use of an infrared or other method of external monitoring and control.

Figure 1:
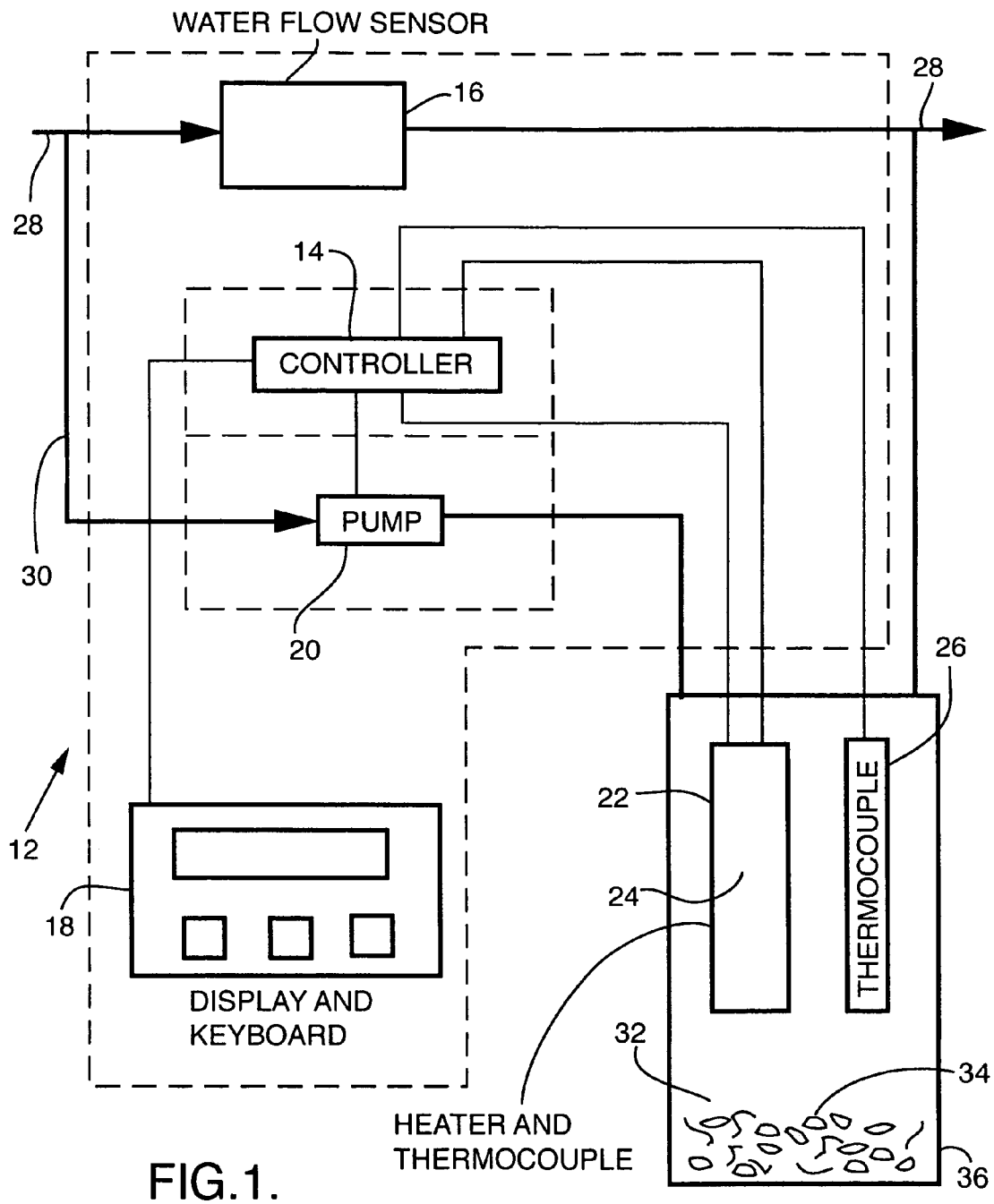
FIG. 1 is a diagrammatic sketch of an apparatus according to the invention within a delivery system according to the invention.

With reference to FIG. 1, this shows generally as 10 a drinking water delivery system containing 2–15 ppm iodine species comprising the unit shown generally as 12 within the dotted lines. Although unit 12 is essentially self-contained, it clearly requires fittings, lines and the like for it to constitute part of full working system 10.

Figure 4:
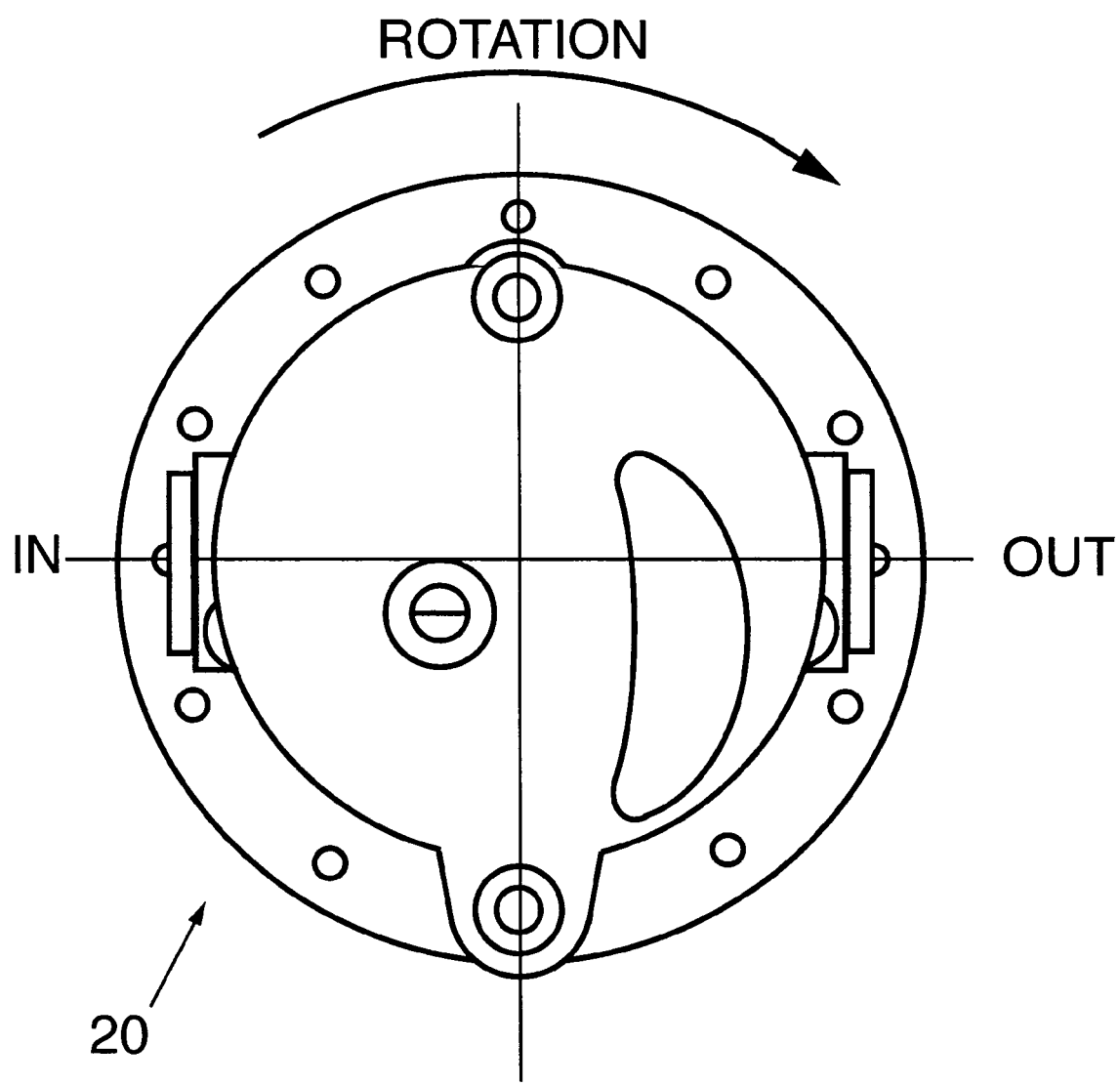
FIG. 4 shows a diagrammatic cross-section of a positive displacement gear pump according to the prior art.

Unit 12 has a microprocessor based controller (CPU) 14 in data communication with a vane-axle turbine water flow rate sensor 16, display and keyboard 18, positive displacement gear pump 20, heater 22, first thermocouple 24 and second thermocouple 26. Pump 20 is shown in slightly more detail in FIG. 4 as a magnetic coupled external gear pump (P-Series-TUTHILL CORPORATION, Concord, Calif.) that provides positive displacement non-pulsing flow of solution over the practical range of flow rates desired.

Main water line 28 provides the main or second flow of water from which secondary line 30 runs off to provide first water flow under the influence of pump 20 which is controlled by CPU 14.

Pump 20 feeds rechargeable cartridge 32 having a chamber 34 containing iodine flakes or prill 36, heater 22 and temperature sensors 24,26.

In the embodiment shown, chamber 34 contains sufficient iodine 36 to always provide a saturated iodine species solution at the pre-selected water temperature in chamber 34, irrespective of the magnitude water flow rate passing through chamber 34, under commercial practical conditions for a livestock operation. If necessary, in alternative embodiments a plurality of cartridges 32 may be used as desired. Saturated iodine solution at about 300 ppm and 80° C. leaves chamber 34 and is added to line 28 at a suitable dilution factor to provide the 2–15 ppm iodine species concentration in the resultant drinking water provided to the livestock.

Small LCD screen and keyboard 18 enable the user input and output to be displayed.

The water delivery system according to the invention uses a computer based controller board to sample the flow rate of the main line water. It also senses the temperature of the incoming water and the temperature of the water in the sump. Based on these variables the controller determines the speed of the DC brushless motor on a gear pump to produce the desired iodine concentration in the main line.

The unit displays the following variables in a 2 second rotation; flow rate, sump temperature, and gallons of concentrate. When the recharge is spent the controller displays a warning for the user. If there are any other errors, the controller will display these with different LEDs and a buzzer.

The temperature sensed is used to determine the amount of power required to bring the water in the sump up to 80° F. if below and then controls the heater to raise the temperature in the sump to 80° F.

The user interface is done using a PDA with infrared. The PDA can capture all of the system variables and store them in a file to be downloaded later. The user can change the concentration of iodine by small amounts and multiples of ppm with the PDA. The user can also tune the temperature sensor to get better control of the iodine concentration. The controller also has the ability to store the system variables on a flash RAM to be downloaded later, to give the user a picture of the water usage, and system performance.

Figure 3:
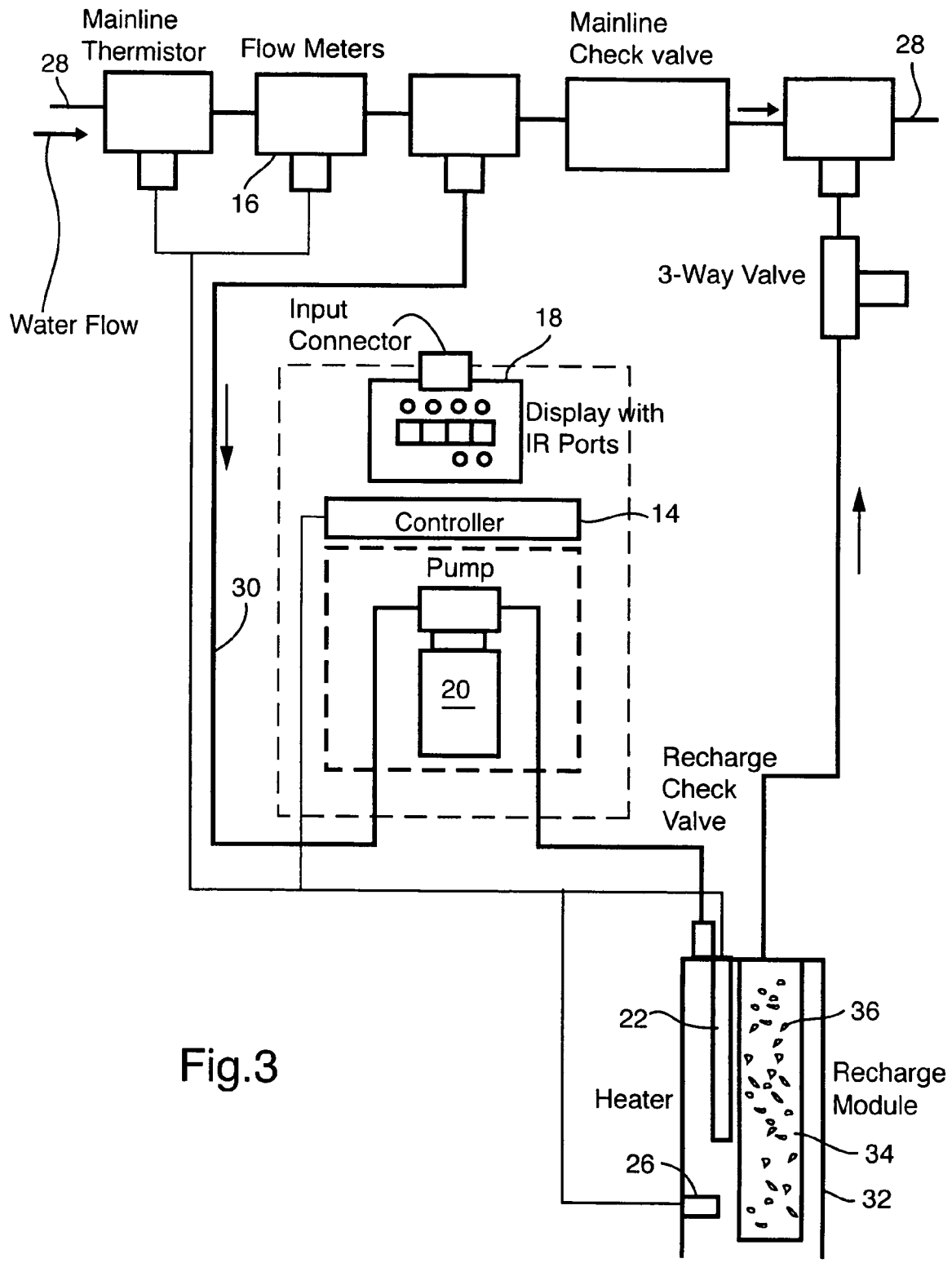
FIG. 3 is a diagrammatic sketch of the embodiment of FIG. 1 in more detail.

A more detailed embodiment is, generally as 100, in FIG. 3, wherein in general, mainline water flows first through a thermistor (the "Mainline Thermistor") and a vane-axle turbine driven flow sensor (the "Flow Sensor"). The thermistor is a thermally sensitive resistor that is made of a semiconductor having a resistance that varies rapidly and predictably with temperature. The Mainline Thermistor is used to determine the amount of energy the heater (the "Heater") in the cartridge or recharge module needs to provide in order to bring the temperature in the Recharge Module up to the set point. The Recharge Thermistor is used to determine the temperature of the iodine saturate in the Recharge Module. The Flow Sensor outputs approximately 1,800 pulses per gallon of water and is used to determine the flow rate and changes in flow rate of the mainline water. The Mainline Thermistor, the Flow Sensor, and the Recharge Thermistor are electronically connected to the microprocessor based controller (the "Controller").

The Controller is driven by a circuit board that continuously scans the temperature and the flow rate data that it receives from the Mainline Thermistor, the Flow Sensor, and the Recharge Thermistor and updates the speed of the Pump and the status of the Heater as changes occur.

The Controller reads the speed of the Pump from the tachometer output signal from the Pump and compares it to the desired speed. The desired speed of the Pump for various flow rates from ⅛ of a gallon a minute and up have been determined on a trial and error basis. The Controller then increases or decreases the speed of the Pump accordingly. The desired speed of the Pump is determined from an algorithm that takes into account the desired concentration of the blended aqueous iodine, the mainline flow rate, the temperature of the mainline water, the temperature of the iodine saturate in the Recharge Module, and the concentration of the iodine saturate. The Controller is programmed to adjust this ratio in response to changes in the temperature in the Recharge Module. When the temperature is less than 80° F., the ratio increases and when the temperature is greater than 80° F., the ratio decreases.

The Controller has an Input Connector that allows the Controller to be connected to a computer in order for the user to change the settings on the Controller. The Controller also has an Infrared Port that allows the user to receive and input data from an infrared device, such as a PDA. The Controller sends a voltage signal (0–4 Vdc. 1 volt DC=1000 rpm) to the Pump that varies the speed of the Pump motor in response to calculations made in accordance with the algorithm. The Controller sends a voltage signal to the Heater (120 VAC) that determines whether the Heater is on or off. The Controller further provides an output to the Display panel that displays Flow Rate, Recharge Module temperature, and the number of gallons through the Recharge Module in rotating two second intervals.

When the Pump is activated, water flows through the delivery system based upon positive water displacement. The Controller determines the speed of the Pump in relation to the desired concentration of blended aqueous iodine to be achieved in the mainline. Blending is gradual and continuous so that no slugs are produced and the desired concentration is established in the mainline at all times. When the Pump is inactivated, no water flows though the system. Two check valves are utilized to prevent back flow. The Mainline Check Valve is used to prevent aqueous iodine from flowing backwards in the mainline water flow and into the injection system. The Recharge Check Valve is used to prevent iodine saturate from flowing back up to the Pump in a powered down situation. This prevents the iodine saturate, which is corrosive, from entering the Pump and potentially damaging the metal components of the Pump. The 3-Way Valve is used to purge air from the Recharge Module.

Failsafe warning signals have been incorporated into the Controller. For instance, when the iodine in the Recharge Module is spent, based on the number of gallons of iodine saturate produced, the Controller displays a warning for the user signalling the requirement to replace the Recharge Module. The Controller also has been programmed to display other error messages with different LED's and a buzzer.

The Infrared Port and the Input Connector allow IoSolutions or the user to download information from the Controller at anytime, either for billing or informational purposes. Updates to the firmware on the Controller also can be downloaded through the Infrared Port and the Input Connector. System variables are stored on a flash RAM chip that can be downloaded later through the Infrared Port or Input Connector to give the user a picture of water usage and system performance.

| Inputs: | |
| --- | --- |
| Thermistor: | Resistance signal that is proportional to Temperature. |
| Flow Meter: | Pulse input. Approx. 1800 pulses/gal. |
| Input connector: | Connects to a computer to allow user to change the settings on the controller. |
| IR Port: | Allows user input from an IR device (i.e. PDA) |

| Outputs: | |
| --- | --- |
| Pump: | Voltage Signal. 0–4 Vdc. 1 volt DC = 1000 rpm. |
| Heater: | Voltage Signal. 120 VAC. Either on or off. |
| Display: | Displays the Flow rate, Temperature in the Recharge Module, and the gallons through the recharge cartridge at 2 sec intervals. |

| Mechanical Devices: | |
| --- | --- |
| Mainline Check Valve: | Used to prevent the iodine flowing around in a loop |
| Recharge Check Valve: | Used to prevent the iodine flowing back up to the Pump in a powered down situation. |
| 3-way Valve: | Used to purge the air from the Recharge Module. |

Inputs

The following is a list of input for the controller

Flow meter sensor 16 measures the flow rate of the main line water by pulse output;

Thermocouple 26 measures the temperature in cartridge 32;

Thermocouple inside heater 24 measures the temperature of the heater as a safety device to prevent heater 24 from damaging cartridge 32;

Keyboard 18 allows user to adjust variables in program.

Outputs

The following is a list of outputs for controller 14, which controls or measures:

Pump 20 by adjusting the speed of the pump under a voltage signal (0–5 Vdc).

Heater 24 by controlling the temperature in cartridge 32. On/Off device 120 Vac controlled through a solid-state relay.

Display 18 shows the through cartridge 32 and the user adjustable variables.

Figure 2:
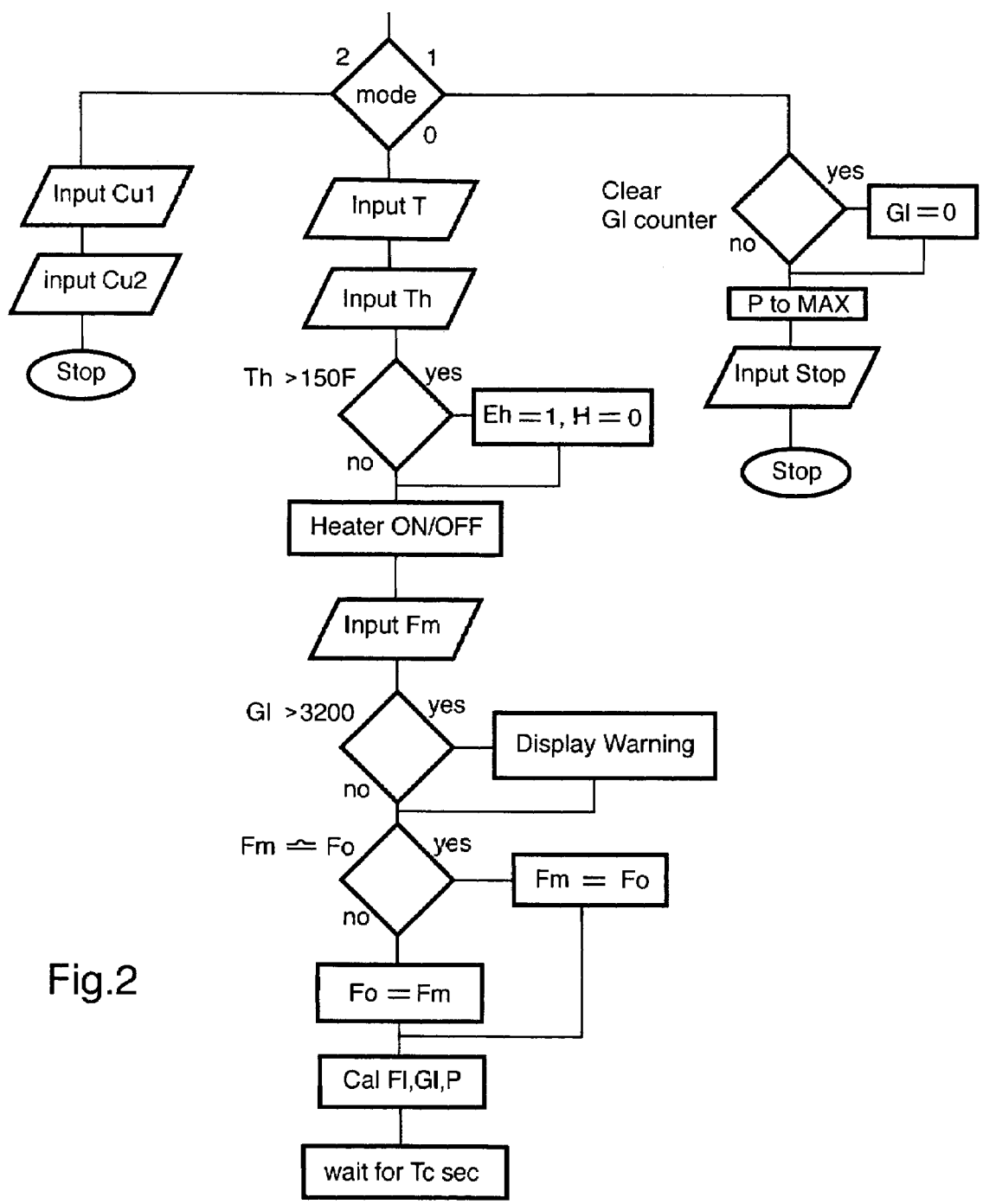
FIG. 2 represents an embodiment of the algorithmic flow chart for the operation of the process according to the invention.

The variables considered in the process according to the invention are shown in FIG. 2, wherein:

| | |
| --- | --- |
| $F_M$ | Main line flow rate. |
| | Pulse input from flow meter |
| $F_L$ | Desired flow rate through liquor line. |
| | Calculated from $F_M$, $C_{U1}$, and $C_{U2}$. |
| $F_O$ | Stored Flow Rate |
| | Used for comparison to $F_M$ to determine if there is a large change is the flow rate. |
| $G_L$ | Gallon Count through liquor line. |
| | Calculated from $F_L$, K, $t_{sp}$, and $t_c$. |
| $C_{U1}$ | User Input Constant. |
| | Allows user to make small adjustments to the pump speed. |
| $C_{U2}$ | User Input Constant. |
| | Allows user to adjust the pump speed in multiples of the default speed. |
| K | Constant of the Flow meter |
| | Manufacturer specification in pulses/gal |
| $t_{sp}$ | Sample period for flow meter. |
| | Time allotted to count pulses. |
| $t_C$ | Cycle period. |
| | Time from one sample to the next. |
| T | Temperature reading from the thermocouple. |
| $T_H$ | Temperature reading of the heater from the thermocouple inside the heater. |
| P | Input voltage signal to the pump. |
| | Calculated from $F_L$, and $C_T$. |
| $C_T$ | Temperature Constant |
| | Adjustment for temperatures over 80° F. |
| H | Heater status flag |
| | True if T less than 80° F. else false. |
| I | Indicator of the usage of the recharge. |
| | 0 if 3200 − $G_L$ > 500 |
| | 1 if 3200 − $G_L$ < 500 |
| | 2 if 3200 − $G_L$ < 100 |
| $E_H$ | Error flag on heater. |
| | true if $T_H$ < 150° F. |

Calculations

The following are the equations to calculate the variables:

$$F_L=(F_M/50+C_{U1})*C_{U2}$$

Liquor line flow rate is 1/50 (default concentration) of the main line flow rate plus the user's small adjustment times the user's multiplier.

$$G_L=G_L+(F_L/(K*t_{sp})*t_c)$$

Gallon count is a running total of the liquor line flow rate divided by the flow meter constant and sample period times the cycle period.

$$P=X*F_L-C_T$$

Pump speed is a function of liquor line flow minus the adjustment due temperature. X is a function of the liquor line flow to produce a voltage output signal. This is to be determined.

Error Conditions

The following are the error conditions and the reactions to them.

Heater failure—If the heater temperature exceeds 150° F. $E_H$ is turned on and the heater H is turned off and remains off until the system is reset. A warning is shown on the display.

Recharge Empty—If the recharge indicator I changes to 1 show a warning on the display. If the indicator changes to 2 show a different warning.

Modes

Once the power of the controller is turned on the user has a choice of modes, selected by the use of the keyboard. The following is a detailed description of the different modes (Start-up, User input, and Normal) of operation of the controller.

User Input Mode

The user input mode allows the user to change the two variables $C_{U1}$, and $C_{U2}$. The adjustments are made through the keyboard. The values for $C_{U1}$ are ±10. The values of $C_{U2}$ are 0.5, 1, 1.5, and 2.

Start-Up Mode

The start-up mode is used when a new cartridge 32 is connected to the system. Heater 22 is turned off and the heater error flag is reset. The user is prompted on whether to reset the water volume count to zero. Pump 20 comes on in maximum output (4 Vdc) to fill the recharge. User input is required to stop pump 20 when cartridge 32 is full.

Normal Mode

The normal mode is the operation that controls pump 20 due to changes in the flow rate. The temperature of both thermocouples is measured. If the temperature of $T_H$ is greater than 150° F. the error flag $E_H$ is set to True. If the temperature of T is less than 80° F. heater 22 is turned on. Sample the flow meter $F_M$. Determine whether there is a large change in the flow rate to the stored rate. If there was, store the new flow rate else use the stored flow rate. Calculate $F_L$ and $G_L$. Check the state of the recharge, if recharge is close to empty display the appropriate warning. Calculate the speed of the pump P. Output P to the pump. Pause for $t_C$ and repeat.

Options

To increase the capabilities of the unit for an increased flow rate another pump is required. Adding the second pump requires an increase in the DC power supply to 130 W, and a second output 0–5 VDC signal.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

The invention claimed is:

1. An animal drinking water apparatus for providing controlled addition of a first aqueous solution having a first concentration of a chemical species at a first flow rate to a second aqueous solution having a second flow rate to provide a diluted first solution of a desired selected concentration of said chemical species as said drinking water, said apparatus comprising first solution sensing means to obtain data on the temperature of said first solution;

second solution sensing means to obtain data on said second solution selected from said second flow rate and the temperature of said second solution;

positive displacement injection pump means to effect addition of said first solution to said second solution to provide said diluted first solution; and CPU means (i) to receive said data selected from said second flow rate data and temperature data from said second solution sensing means;

(ii) to receive said temperature sensing data on said first solution from said first solution sensing means;

(iii) to effect algorithmic treatment of said data from said first and second sensing means, to provide pump control data; and (iv) to control said pump means in consequence of said pump control data to effect controlled addition of said first solution to said second solution to provide said diluted first solution of said desired selected concentration of said chemical species as said drinking water, further comprising (a) means for providing a first water flow;

(b) means for providing said second solution at said second flow rate;

(c) mixing means for effecting the dissolution of said chemical species into said first water flow to produce said first aqueous solution having said first concentration of said chemical species at a pre-selected temperature;

(d) heating means for heating said first aqueous solution; and (e) wherein said CPU means further comprises means to effect algorithmic treatment of said temperature data of said first solution; and temperature control means to control said heating means in consequence of said temperature data to provide said pre-determined temperature.

2. Apparatus as defined in claim 1 wherein said second flow rate is variable but said desired selected concentration of said chemical species is constant.

3. Apparatus as defined in claim 2 wherein said second solution sensing means can operatably measure second solution flow rates as low as 0.01 liters/min.

4. Apparatus as defined in claim 2 wherein said chemical species comprises at least one chemical species selected from the group consisting of antibiotics, vitamins, electrolytes, and medicines.

5. Apparatus as defined in claim 1 wherein said second flow rate is variable but said desired selected concentration of said chemical species is constant.

6. Apparatus as defined in claim 5 wherein said second solution sensing means can operatably measure second solution flow rates as low as 0.01 liters/min.

7. Apparatus as defined in claim 1 wherein said first solution is at a saturated concentration of said chemical species.

8. Apparatus as defined in claim 7 wherein said second solution sensing means can operatably measure second solution flow rates as low as 0.01 liters/min.

9. Apparatus as defined in claim 1 wherein said first solution is at a saturated concentration of said chemical species.

10. Apparatus as defined in claim 9 wherein said second solution sensing means can operatably measure second solution flow rates as low as 0.01 liters/min.

11. Apparatus as defined in claim 1 wherein said second solution sensing means can operatably measure second solution flow rates as low as 0.01 liters/min.

12. Apparatus as defined in claim 1 wherein said second solution sensing means can operatably measure second solution flow rates as low as 0.01 liters/min.

13. Apparatus as defined in claim 1 wherein said chemical species comprises at least one chemical species selected from the group consisting of antibiotics, vitamins, electrolytes, and medicines.

14. Apparatus as defined in claim 13 wherein said chemical species comprises iodine species.

15. Apparatus as defined in claim 14 operable wherein an iodine concentration is 2–15 ppm iodine species.

16. Apparatus as defined in claim 1 wherein said chemical species comprises at least one chemical species selected from the group consisting of antibiotics, vitamins, electrolytes, and medicines.

17. Apparatus as defined in claim 1, operable wherein said chemical species in said diluted first solution drinking water is at a concentration of 2–50 ppm.

18. Apparatus as defined in claim 1 operable wherein said second flow rate ranges from 0.01 l/min to 100 l/min.

19. Apparatus as defined in claim 1 operable wherein said second flow rate is less than 0.01 l/min.

20. A method of providing animal drinking water containing a chemical species comprising:
providing a controlled addition of a first aqueous solution having a first concentration of a chemical species at a first flow rate to a second aqueous solution having a second flow rate to provide a diluted first solution having a desired selected concentration of said chemical species as said drinking water using an apparatus comprising first solution sensing means to obtain data on the temperature of said first solution, second solution sensing means to obtain data on said second solution selected from said second flow rate and the temperature of said second solution, positive displacement injection pump means to effect addition of said first solution to said second solution to provide said diluted first solution, and CPU means (i) to receive said data selected from said second flow rate data and temperature data from said second solution sensing means, (ii) to receive said temperature sensing data on said first solution from said first solution sensing means; (iii) to effect algorithmic treatment of said data from said first and second sensing means, to provide pump control data; and (iv) to control said pump means in consequence of said pump control data to effect controlled addition of said first solution to said second solution to provide said diluted first solution of said desired selected concentration of said chemical species as said drinking water, further comprising
(a) means for providing a first water flow;
(b) means for providing said second solution at said second flow rate;
(c) mixing means for effecting the dissolution of said chemical species into said first water flow to produce said first aqueous solution having said first concentration of said chemical species at a pre-selected temperature;
(d) heating means for heating said first aqueous solution; and
(e) wherein said CPU means further comprises means to effect algorithmic treatment of said temperature data of said first solution; and
temperature control means to control said heating means in consequence of said temperature data to provide said pre-determined temperature.

21. The method according to claim 20 wherein said second flow rate is variable but said desired selected concentration of said chemical species is constant.

22. The method according to claim 20 wherein said first solution is at a saturated concentration of said chemical species.

23. The method according to claim 20 wherein said second solution sensing means can operatably measure second solution flow rates as low as 0.01 liters/min.

24. The method according to claim 20 wherein said chemical species comprises at least one chemical species selected from the group consisting of antibiotics, vitamins, electrolytes, and medicines.

25. The method according to claim 24, wherein the water is fed to farm animals or birds.

26. The method according to claim 20, wherein said chemical species comprises iodine species.

27. The method according to claim 26, wherein an iodine concentration is 2–15 ppm iodine species.

28. The method according to claim 20, wherein said chemical species in said diluted first solution drinking water is at a concentration of 2–50 ppm.

29. The method according to claim 20 wherein said second flow rate ranges from 0.01 l/min to 100 l/min.

30. The method according to claim 20 operable wherein said second flow rate is less than 0.01 l/min.

* * * * *